United States Patent
Marks

(10) Patent No.: US 9,359,468 B2
(45) Date of Patent: Jun. 7, 2016

(54) DIVINYLARENE DIOXIDE RESIN COMPOSITIONS

(75) Inventor: Maurice J. Marks, Lake Jackson, TX (US)

(73) Assignee: BLUE CUBE IP LLC, Midland, MI (US)

(*) Notice: Subject to any disclaimer, the term of this patent is extended or adjusted under 35 U.S.C. 154(b) by 313 days.

(21) Appl. No.: 13/576,062

(22) PCT Filed: Feb. 10, 2011

(86) PCT No.: PCT/US2011/024288
§ 371 (c)(1),
(2), (4) Date: Jul. 30, 2012

(87) PCT Pub. No.: WO2011/103014
PCT Pub. Date: Aug. 25, 2011

(65) Prior Publication Data
US 2013/0005899 A1  Jan. 3, 2013

Related U.S. Application Data

(60) Provisional application No. 61/306,220, filed on Feb. 19, 2010.

(51) Int. Cl.
*C08G 59/62* (2006.01)
*C08G 59/24* (2006.01)

(52) U.S. Cl.
CPC ............ *C08G 59/245* (2013.01); *C08G 59/621* (2013.01)

(58) Field of Classification Search
CPC .............................. C08G 59/621; C08G 59/245

USPC ........................................................ 524/543
See application file for complete search history.

(56) References Cited

U.S. PATENT DOCUMENTS

| | | | |
|---|---|---|---|
| 2,912,389 A * | 11/1959 | Phillips et al. | 528/103 |
| 2,924,580 A | 2/1960 | Phillips et al. | |
| 4,808,692 A | 2/1989 | Pham et al. | |

FOREIGN PATENT DOCUMENTS

| | | |
|---|---|---|
| EP | 0878472 | 5/1995 |
| GB | 855025 | 11/1960 |
| WO | 2009119513 | 10/2009 |
| WO | 2010077484 | 7/2010 |
| WO | 2010113784 | 10/2010 |

OTHER PUBLICATIONS

Organic Coatings Science and Technology by Z.W. Wicks, Jr., F.N. Jones, and S. P. Pappas (2nd ed., Wiley-Interscience, New York, 1999, p. 488) (Can't find).

* cited by examiner

*Primary Examiner* — Angela C Scott
(74) *Attorney, Agent, or Firm* — Polsinelli PC

(57) ABSTRACT

A curable divinylarene dioxide resin composition including (a) at least one divinylarene dioxide, and (b) at least one diphenol curing agent; a process for making the curable divinylarene dioxide resin composition; and a cured divinylarene dioxide resin composition made therefrom. The cured product made from the above curable divinylarene dioxide resin composition offers improved properties such as lower viscosity and a high heat resistance compared to known cured products prepared from known epoxy resins.

12 Claims, No Drawings

DIVINYLARENE DIOXIDE RESIN COMPOSITIONS

The present invention relates to curable epoxy resin compositions; and more specifically; to curable divinylarene dioxide resin compositions which are cured with phenolic compounds; and thermosets prepared from such curable divinylarene dioxide resin compositions.

Divinylarene dioxides are known resins used for producing thermosets using amine, anhydride, or polyphenolic curing agents. For example, GB 854679 describes curable compositions of divinylbenzene dioxide and polyfunctional amines; GB 855025 describes curable compositions of divinylbenzene dioxide and carboxylic acid anhydrides; and WO 2009/119513A1 describes curable compositions of divinylbenzene dioxide and polyphenolics. None of the references cited above disclose curable compositions of divinylarene dioxides and diphenols.

As described in *Organic Coatings Science and Technology* by Z. W. Wicks, Jr., F. N. Jones, and S. P. Pappas ($2^{nd}$ ed., Wiley-Interscience, New York, 1999, p. 488), phenolic curing agents are used for epoxy resins where enhanced chemical and corrosion resistance are needed. However, the range of commercially available polyphenolic curing agents is very limited; and thus it would be desirable to develop a broader range of phenolic curing agents which can provide a thermoset having good properties with respect to processability and cured properties.

Heretofore, diphenols have not been successfully used as a curing agent for known epoxy resins. Instead, diphenols have only been used as extenders and not as curing agents. For example, U.S. Pat. No. 4,808,692 describes a process for preparing advanced epoxy resins from conventional epoxy resins and diphenols using phosphonium catalysts. Such advanced epoxy resins are not cured but rather are soluble in organic solvents and have a finite melt viscosity.

Accordingly, it is desired to provide a cured epoxy resin derived from divinylarene dioxides and diphenols, wherein the cured epoxy resin exhibits a heat resistance as determined by glass transition temperature ($T_g$) above room temperature (about 25° C.); and wherein the cured epoxy resin is insoluble in organic solvents.

The problems of the prior art may be addressed by preparing a curable divinylarene dioxide resin composition derived from a divinylarene dioxide and a diphenol. Surprisingly, it has been found that divinylarene dioxides, unlike other epoxy resins, react with diphenols to form epoxy thermosets.

One embodiment of the present invention is directed to a curable divinylarene dioxide resin composition comprising (a) at least one divinylarene dioxide; (b) at least one diphenol curing agent; and (c) optionally, a curing catalyst.

Another embodiment of the present invention is directed to a process for preparing the above curable divinylarene dioxide resin composition.

Still another embodiment of the present invention is directed to a thermoset derived from the above curable divinylarene dioxide resin composition.

In one embodiment, the resulting curable thermoset formulation may be used in various applications, such as for example, coatings, adhesives, composites, electronics, foams, and the like.

Divinylarene dioxides cured with diphenols have both good heat resistance and good solvent resistance compared to reaction products of epoxy resins and diphenols of the prior art.

In its broadest scope, the present invention includes a curable divinylarene dioxide resin composition comprising (a) at least one divinylarene dioxide, such as for example a divinylbenzene dioxide (DVBDO); and (b) at least one diphenol curing agent. The resulting curable resin composition or formulation may include one or more optional additives well known in the art; and may be used to prepare a thermoset therefrom.

The curable divinylarene dioxide resin composition comprising the divinylarene dioxides and diphenol curing agent advantageously provides novel resins having good heat resistance and good solvent resistance.

The divinylarene dioxide such as DVBDO useful in epoxy resin compositions of the present invention is a divinylarene dioxide which may be prepared by reacting a divinylarene and hydrogen peroxide to provide the divinylarene dioxide useful in preparing the divinylarene dioxide resin of the present invention.

The divinylarene dioxides useful in the present invention, particularly those derived from divinylbenzene such as for example DVBDO, are class of diepoxides which have a relatively low liquid viscosity but impart higher heat resistance and rigidity in its derived thermosets than do conventional epoxy resins. The epoxide group in divinylarene dioxides is significantly less reactive than that in conventional glycidyl ethers used to prepare prior art epoxy resins.

The divinylarene dioxide useful in the present invention may comprise, for example, any substituted or unsubstituted arene nucleus bearing two vinyl groups in any ring position. The arene portion of the divinylarene dioxide may consist of benzene, substituted benzenes, (substituted) ring-annulated benzenes or homologously bonded (substituted) benzenes, or mixtures thereof. The divinylbenzene portion of the divinylarene dioxide may be ortho, meta, or para isomers or any mixture thereof. Additional substituents may consist of $H_2O_2$-resistant groups including saturated alkyl, aryl, halogen, nitro, isocyanate, or RO— (where R may be a saturated alkyl or aryl). Ring-annulated benzenes may consist of naphthlalene, tetrahydronaphthalene, and the like. Homologously bonded (substituted) benzenes may consist of biphenyl, diphenylether, and the like.

In one embodiment, the divinylarene dioxide used in the present invention may be produced, for example, by the process described in U.S. Patent Application Ser. No. 61/141,457, filed of even date herewith, by Marks et al. incorporated herein by reference.

The divinylarene dioxide used for preparing the composition of the present invention may be illustrated generally by general chemical Structures I-IV as follows:

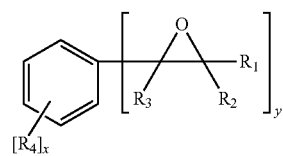

Structure I

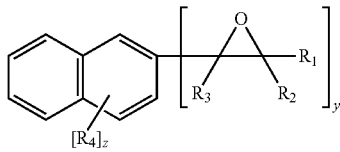

Structure II

-continued

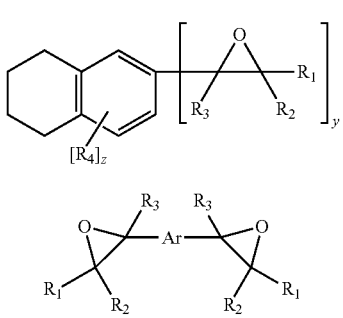

Structure III

Structure IV

In the above Structures I-IV of the divinylarene dioxide comonomer of the present invention, each $R_1$, $R_2$, $R_3$ and $R_4$ individually may be hydrogen, an alkyl, cycloalkyl, an aryl or an aralkyl group; or a $H_2O_2$-resistant group including for example a halogen, a nitro, an isocyanate, or an RO group, wherein R may be an alkyl, aryl or aralkyl; x may be an interger of 0 to 4; y may be an integer greater than or equal to 2; x+y may be an integer less than or equal to 6; z may be an interger of 0 to 6; and z+y may be an integer less than or equal to 8; and Ar is an arene fragment including for example, 1,3-phenylene group.

The divinylarene dioxide component useful in the present invention may include for example divinylbenzene dioxide, divinylnaphthalene dioxide, divinylbiphenyl dioxide, divinyldiphenylether dioxide, and mixtures thereof. Preferably, the divinylarene dioxide used in the present invention is divinylbenzene dioxide.

Structure V below illustrates an embodiment of a preferred chemical structure of the DVBDO useful in the present invention:

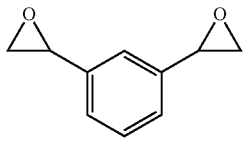

Structure V

Structure VI below illustrates another embodiment of a preferred chemical structure of the DVBDO useful in the present invention:

Structure VI

When DVBDO is prepared by the processes known in the art, it is possible to obtain one of three possible isomers: ortho, meta, and para. Accordingly, the present invention includes a DVBDO illustrated by any one of the above Structures individually or as a mixture thereof. Structures V and VI above show the meta (1,3-DVBDO) and para isomers of DVBDO, respectively. The ortho isomer is rare; and usually DVBDO is mostly produced generally in a range of from about 9:1 to about 1:9 ratio of meta (Structure V) to para (Structure VI) isomers. The present invention preferably includes as one embodiment a range of from about 6:1 to about 1:6 ratio of Structure V to Structure VI, and in other embodiments the ratio of Structure V to Structure VI may be from about 4:1 to about 1:4 or from about 2:1 to about 1:2.

In another embodiment of the present invention, the divinylarene dioxide may contain quantities (such as for example less than about 20 weight percent) of substituted arenes. The amount and structure of the substituted arenes depend on the process used in the preparation of the divinylarene precursor to the divinylarene dioxide. For example, divinylbenzene prepared by the dehydrogenation of diethylbenzene (DEB) may contain quantities of ethylvinylbenzene (EVB) and DEB. Upon reaction with hydrogen peroxide, EVB produces ethylvinylbenzene monoxide while DEB remains unchanged. The presence of these compounds can increase the epoxide equivalent weight of the divinylarene dioxide to a value greater than that of a pure divinylarene dioxide compound.

In one embodiment, the divinylarene dioxide, for example DVBDO, useful in the present invention comprises a low viscosity liquid epoxy resin (LER) composition. The viscosity of the divinylarene dioxide used in the process for making the epoxy resin composition of the present invention ranges generally from about 10 centipoise (cP) to about 100 cP, preferably from about 10 cP to about 50 cP, and more preferably from about 10 cP to about 25 cP at 25° C.

One of the advantageous properties of the divinylarene dioxides useful in the present invention is their thermal stability which allows their use in formulations or processing at moderate temperatures (for example, at from about 100° C. to about 200° C.) for up to several hours (for example, for at least 2 hours) without oligomerization or homopolymerization. Oligomerization or homopolymerization during formulation or processing is evident by a substantial increase in viscosity or gelling (crosslinking). The divinylarene dioxides useful in the present invention have sufficient thermal stability such that the divinylarene dioxides do not experience a substantial increase in viscosity or gelling during formulation or processing at moderate temperatures.

Another advantageous property of the divinylarene dioxide useful in the present invention may be for example its rigidity. The rigidity property of the divinylarene dioxide is measured by a calculated number of rotational degrees of freedom of the dioxide excluding side chains using the method of Bicerano described in *Prediction of Polymer Properties*, Dekker, N.Y., 1993. The rigidity of the divinylarene dioxide used in the present invention may range generally from about 6 to about 10, preferably from about 6 to about 9, and more preferably from about 6 to about 8 rotational degrees of freedom, as measured or determined by the above Bicerano process.

The concentration of the divinylarene dioxide used to prepare the divinylarene dioxide resin of the present invention may range generally from about 99 weight percent (wt %) to about 1 wt %; preferably, from about 90 wt % to about 10 wt %; and more preferably, from about 75 wt % to about 25 wt %.

The diphenol curing agent (also referred to as a hardener or cross-linking agent), component (b), useful in preparing the curable divinylarene dioxide resin composition of the present invention may be any conventional diphenolic compound. For example, the diphenol useful in the practice of the present invention may be a one ring or multi-ring diphenol.

Examples of suitable diphenols useful in the present invention include monomeric or oligomeric diphenols, bisphenols, and mixtures thereof. Mixtures of any two or more diphenols can also be used in the practice of the present invention. Other suitable diphenol compounds useful in the present invention are described in U.S. Pat. No. 4,358,578; incorporated herein by reference.

Preferred examples of the diphenols useful in the present invention may include for example any substituted or unsubstituted diphenol such as, bisphenol A, a difunctional phenolic hardener such as D.E.H. 80 phenolic resin (an oligomer derived from bisphenol A and bisphenol A diglycidyl ether), and optionally including a monophenol such as p-t-butylphenol, cresol, chlorophenol, anisole, phenol, and mixtures thereof.

The concentration of the diphenol used to prepare the curable divinylarene dioxide resin composition of the present invention as an equivalent ratio r of epoxide to phenolic groups may range generally from about 0.10 to about 10, preferably from about 0.25 to about 8, more preferably from about 0.5 to about 5, and most preferably from about 1.0 to about 2.

An optional co-curing agent may be used in the preparing the curable divinylarene dioxide resin composition of the present invention; and may comprise any conventional co-curing agent known in the art for curing epoxy resins. For example, the co-curing agents, useful in the curable composition, may be selected from those co-curing agents well known in the art including, but are not limited to, anhydrides, carboxylic acids, amine compounds, phenolic compounds, polyols, or mixtures thereof.

Examples of co-curing agents useful in the present invention may include any of the curing materials known to be useful for curing epoxy resin based compositions. Such co-curing agents include, for example, polyamine, polyamide, polyaminoamide, dicyandiamide, polyphenol, polymeric thiol, polycarboxylic acid and anhydride, and any combination thereof or the like. Suitable catalytic curing agents include tertiary amine, quaternary ammonium halide, Lewis acids such as boron trifluoride, and any combination thereof or the like. Other specific examples of co-curing agent include phenol novolacs, bisphenol-A novolacs, phenol novolac of dicyclopentadiene, cresol novolac, diaminodiphenylsulfone, styrene-maleic acid anhydride (SMA) copolymers; and any combination thereof. Among the conventional co-curing agents, amines and amino or amido containing resins and phenolics are preferred.

Dicyandiamide may be one preferred embodiment of the co-curing agent useful in the present invention. Dicyandiamide has the advantage of providing delayed curing since dicyandiamide requires relatively high temperatures for activating its curing properties; and thus, dicyandiamide can be added to an epoxy resin and stored at room temperature (about 25° C.).

When a co-curing agent is used in the present invention, the amount of the co-curing agent used in the curable divinylarene dioxide resin composition, the percentage of equivalents of the diphenol curing agent to that of the total equivalents of all of the curing agent generally ranges from about 10 equivalent percent to about 100 equivalent percent, preferably from about 25 equivalent percent to about 100 equivalent percent, and more preferably from about 50 equivalent percent to about 100 equivalent percent.

In preparing the curable divinylarene dioxide resin composition of the present invention, optionally at least one curing catalyst may be used to facilitate the curing of the divinylarene dioxide compound and the diphenol curing agent. The catalyst useful in the present invention may include any conventional reaction catalyst known in the art such as for example tertiary amines, quaternary ammonium salts, quaternary phosphonium salts, and mixtures thereof.

In a preferred embodiment, a suitable catalyst employed in the practice of the present invention may include, for example, one or more of the following: tertiary amines; imidazoles; quaternary ammonium halides and carboxylates; quaternary phosphonium halides and carboxylates; and mixtures thereof.

The preferred optional catalysts may include for example a tertiary amine such as benzyldimethylamine or 2-phenylimidazole; a quaternary ammonium salt such as tetrabutylammonium bromide; a phosphonium salt such as tetrabutylphosphonium bromide; and mixtures thereof.

The curing catalyst is generally employed in an amount of from 0 wt % to about 20 wt %; preferably from about 0.01 wt % to about 10 wt %; more preferably from about 0.1 wt % to about 5 wt %; and most preferably from about 0.2 wt % to about 2 wt %, based on the combined weight of the composition.

Also to facilitate the reaction of the divinylarene dioxide compound and the diphenol curing agent, an optional solvent may be used in preparing the curable divinylarene dioxide resin composition of the present invention. For example, one or more organic solvents well known in the art may include aromatic hydrocarbons, alkyl halides, ketones, alcohols, ethers, and mixtures thereof.

The concentration of the solvent used in the present invention may range generally from 0 wt % to about 90 wt %, preferably from about 0.01 wt % to about 80 wt %; more preferably from about 1 wt % to about 70 wt %; and most preferably from about 10 wt % to about 60 wt %.

Also to facilitate the reaction of the divinylarene dioxide compound and the diphenol curing agent, an optional monophenol may be used in preparing the curable divinylarene dioxide resin composition of the present invention. For example, one or more monophenols well known in the art may be used in the present invention and may include phenol; alkylphenols such as o-, m-, and p-cresol and p-tert-butylphenol; halogenated phenols such as m-chlorophenol; alkoxyphenols such as anisole; arylphenols such as p-phenylphenol; aryloxyphenols such as 4-hydroxydiphenylether; polycyclic phenols such as 1- or 2-naphthol; and mixtures thereof.

The concentration of the optional monophenol used in the present invention may range generally from 0 wt % to about 50 wt %, preferably from about 0.01 wt % to about 50 wt %, more preferably from about 0.1 wt % to about 45 wt %, and most preferably from about 1 wt % to about 40 wt %.

The curable or thermosettable divinylarene dioxide resin composition of the present invention may optionally contain one or more other additives which are useful for their intended uses. For example, known additives useful for the preparation, processing, storage, and curing of resin compositions may be used as optional additional components in the curable divinylarene dioxide resin composition of the present invention. The optional additives useful in the present invention composition may include, for example but not limited to, other resins, stabilizers, fillers, plasticizers, catalyst de-activators, surfactants, flow modifiers, pigments or dyes, matting agents, degassing agents, flame retardants (e.g., inorganic flame retardants, halogenated flame retardants, and non-halogenated flame retardants such as phosphorus-containing materials), toughening agents, curing initiators, curing inhibitors, wetting agents, colorants or pigments, thermoplastics, processing aids, UV blocking compounds, fluorescent compounds, UV stabilizers, inert fillers, fibrous reinforcements, antioxidants, impact modifiers including thermoplastic particles, and mixtures thereof. The above list is intended to be exemplary and not limiting. The preferred additives for the formulation of the present invention may be selected by the skilled artisan.

Preferred optional components useful in preparing various embodiments of the curable divinylarene dioxide resin composition of the present invention may include for example fillers such as clay, talc, silica, and calcium carbonate; solvents such as ethers and alcohols; toughening agents such as elastomers and liquid block copolymers; pigments such as carbon black and iron oxide; surfactants such as silicones; fibers such as fiberglass and carbon fiber; and mixtures thereof.

The concentration of the additional additives is generally between about 0 wt % to about 90 wt %; preferably, between about 0.01 wt % to about 80 wt %; more preferably, between about 1 wt % to about 65 wt %; and most preferably, between about 10 wt % to about 50 wt %, based on the weight of the total composition.

The preparation of the curable divinylarene dioxide resin composition of the present invention is achieved by admixing (a) a divinylarene dioxide, (b) a diphenol curing agent, (c) optionally, a catalyst, and (d) optionally, a solvent. The above components may be mixed in any order. Any of the above-mentioned optional assorted formulation additives, for example fillers, may also be added to the composition during the mixing or prior to the mixing to form the composition.

All the components of the curable divinylarene dioxide resin composition are typically mixed and dispersed at a temperature enabling the preparation of an effective curable divinylarene dioxide resin composition having a low viscosity for the desired application. The temperature during the mixing of all components may be generally from about 0° C. to about 100° C. and preferably from about 20° C. to about 50° C.

The polymerizable or curable formulation or composition of the present invention can be cured under conventional processing conditions to form a thermoset. The resulting thermoset displays excellent thermo-mechanical properties, such as good toughness and mechanical strength, while maintaining high thermal stability.

The process for preparing a cured thermoset includes (i) preparing a curable divinylarene dioxide resin composition comprising admixing (a) at least one divinylarene dioxide resin; and (b) at least one diphenol curing agent; and (ii) heating the composition of step (i) at a temperature of from about 25° C. to about 300° C. Optionally, the process may include forming the composition of step (i) into an article prior to the heating of step (ii).

The process to produce the thermoset products of the present invention may be performed by gravity casting, vacuum casting, automatic pressure gelation (APG), vacuum pressure gelation (VPG), infusion, filament winding, lay up injection, transfer molding, prepreging, dipping, coating, spraying, brushing, and the like.

The curing reaction conditions include, for example, carrying out the reaction under a temperature, generally in the range of from about 0° C. to about 300° C.; preferably, from about 20° C. to about 250° C.; and more preferably, from about 50° C. to about 200° C.

The pressure of the curing reaction may be carried out, for example, at a pressure of from about 0.01 bar to about 1000 bar; preferably, from about 0.1 bar to about bar 100; and more preferably, from about 0.5 bar to about 10 bar.

The curing of the curable or thermosettable composition may be carried out, for example, for a predetermined period of time sufficient to partially cure or to completely cure the composition. For example, the curing time may be chosen between about 1 minute to about 24 hours, preferably between about 10 minutes to about 12 hours, and more preferably between about 100 minutes to about 8 hours.

The curing process of the present invention may be a batch or a continuous process. The reactor used in the process may be any reactor and ancillary equipment well known to those skilled in the art.

The cured or thermoset product prepared by curing curable divinylarene dioxide resin composition of the present invention advantageously exhibits an improved balance of thermo-mechanical properties (e.g. transition temperature, modulus, and toughness). The cured product can be visually transparent or opalescent. Compared to analogous compositions prepared using only conventional epoxy resins, the thermosets prepared using the epoxy resins of the present invention have a higher $T_g$ (10%-100% higher) and are insoluble (rather than soluble) in organic solvents.

Tg typically depends on the curing agent and the epoxy resin used. As one illustration, the Tg of the cured divinylarene dioxide resin composition of the present invention may be from about 10% to about 100% higher than its corresponding conventional epoxy resin.

The curable divinylarene dioxide resin composition of the present invention, when cured, is capable of providing a thermoset or cured product wherein the heat resistance of the thermoset ranges generally from about 25° C. to about 300° C.; preferably, from about 50° C. to about 275° C.; and more preferably, from about 100° C. to about 250° C. as measured by the glass transition temperature ($T_g$) using differential scanning calorimetry (DSC).

The curable divinylarene dioxide resin composition of the present invention, when cured, is also capable of providing a thermoset, wherein the solvent resistance of the thermoset as measured by the weight % soluble fraction in tetrahydrofuran is generally 0, preferably about 25, more preferably about 50, and most preferably about 75.

The curable divinylarene dioxide resin compositions of the present invention are useful for the preparation of epoxy thermosets or cured products in the form of coatings, films, adhesives, laminates, composites, electronics, and the like.

As an illustration of the present invention, in general, the curable divinylarene dioxide resin compositions may be useful for casting, potting, encapsulation, molding, and tooling. The present invention is particularly suitable for all types of electrical casting, potting, and encapsulation applications; for molding and plastic tooling; and for the fabrication of divinylarene dioxide resin based composites parts, particularly for producing large epoxy resin-based parts produced by casting, potting and encapsulation. The resulting composite material may be useful in some applications, such as electrical casting applications or electronic encapsulations, castings, moldings, potting, encapsulations, injection, resin transfer moldings, composites, coatings and the like.

EXAMPLES

The following examples and comparative examples further illustrate the present invention in detail but are not to be construed to limit the scope thereof.

In the following Examples, various terms and designations used are as follows: "$T_g$" stands for glass transition temperature; "$T_d$" stands for thermal decomposition temperature; "PTBP" stands for p-t.-butylphenol (a monophenol); "DER 332" is a conventional epoxy resin having an epoxide equivalent weight (EEW) of 173 and is commercially available from The Dow Chemical Company; "THF" stands for tetrahydrofuran; "A-1" stands for ethyltriphenylphosphonium acetate-acetic acid complex (70 wt. % in methanol) and is a catalyst commercially available from Morton International Co.; "1B2MZ" stands for 1-benzyl-2-methylimidazole and is a catalyst commercially available from Air Products Inc.; "DSC" stands for differential scanning calorimetry; "CTE" sands for coefficient of thermal expansion; "E" stands for tensile modulus; and "$K_{1C}$" stands for critical stress intensity factor (a measure of fracture toughness).

In the following Examples, standard analytical equipment and methods are as follows: Tg is measured by DSC and is taken as the midpoint of the first-order change in the heat flow curve; $T_d$ is measured by the extrapolated onset method using thermogravimetric analysis (TGA); Residue is the wt % sample remaining after heating to 600° C. under nitrogen using TGA; "THF Soak" is measured by placing a specimen in ~100 volumes of THF and observing the presence or absence of insoluble (gel) fraction after standing at room temperature for 24 hours; CTE is measured by thermomechanical analysis, wherein the subscripts refer to the glassy (sub-$T_g$) or rubbery (super-$T_g$) values; E is measured according to the method of ASTM D638-03 using Type I specimens; and $K_{1C}$ is measured according to the method of ASTM D-5045 using the compact tension specimen geometry.

Examples 1-7 and Comparative Example A

In Examples 1-7, DVBDO is mixed with bisphenol A (a diphenol) and optionally a catalyst in the amounts indicated in Table I to form a curable formulation. In Comparative Example A, DER 332 is mixed with bisphenol A to form a non-curable formulation. The formulations are then heated at 200° C. for 60 minutes. Where indicated, A-1 is used as catalyst at ~0.1 wt. % and 1B2MZ is used as catalyst at ~2 wt. %. DSC results are obtained after curing the formulations. The ratio of epoxide/phenolic equivalents is r. The components and results are described in Table I. Comparative Example A does not cure under these conditions and therefore remains fully soluble in tetrahydrofuran.

TABLE I

| EXAMPLE | DVBDO g | DVBDO eq. | DER 332 g | DER 332 eq. | Bisphenol A g | Bisphenol A eq. | r | $T_g$ (° C.) | Catalyst | THF Soak |
|---|---|---|---|---|---|---|---|---|---|---|
| Comparative Example A | | | 2.59 | 0.015 | 1.14 | 0.010 | 1.5 | | none | soluble |
| 1 | 2.51 | 0.031 | | | 2.94 | 0.026 | 1.2 | 106 | " | insoluble |
| 2 | 2.75 | 0.034 | | | 2.59 | 0.023 | 1.5 | 113 | " | insoluble |
| 3 | 2.52 | 0.031 | | | 2.94 | 0.026 | 1.2 | 117 | A-1 | insoluble |
| 4 | 2.52 | 0.031 | | | 2.94 | 0.026 | 1.2 | 138 | 1B2MZ | insoluble |
| 5 | 2.82 | 0.035 | | | 2.59 | 0.023 | 1.5 | 146 | " | insoluble |
| 6 | 3.02 | 0.037 | | | 2.11 | 0.019 | 2.0 | 163 | " | insoluble |
| 7 | 2.52 | 0.031 | | | 2.68 | 0.024 | 1.2 | 121 | 1B2MZ, +0.002 eq. PTBP | insoluble |

Examples 8-10

The properties of the resulting cured product from the formulations of Table I are measured and set forth in Table II. Example 8 is the cured product resulting from curing the formulation of Example 4; Example 9 is the cured product resulting from curing the formulation of Example 5; and Example 10 is the cured product resulting from curing the formulation of Example 6.

In these Examples 8-10, plaques weighing about 400 g and 12 inches by 12 inches by ⅛ inch thick in size are prepared by curing DVBDO with bisphenol A in the presence of 1B2MZ catalyst at 200° C. for 60 minutes in a mold. The results for Examples 8-10 are described in Table II.

TABLE II

| EXAMPLE | r | $T_g$ (° C.) | $CTE_g$ (μm/ m-° C.) | $CTE_r$ (μm/ m-° C.) | $T_d$ (ext) (° C.) | Residue (%) | E (Mpa) | $K_{1C}$ (MPa-$m^{0.5}$) |
|---|---|---|---|---|---|---|---|---|
| 8 | 1.2 | 137 | 58.54 | 206.6 | 362 | 15.88 | 4220 | 0.77 |
| 9 | 1.5 | 149 | 54.14 | 191.4 | 376 | 17.41 | 4348 | 0.68 |
| 10 | 2.0 | 172 | 68.06 | 179.8 | 368 | 24.11 | 4198 | 1.30 |

The invention claimed is:

1. A curable divinylarene dioxide resin composition comprising:
    (a) at least one divinylarene dioxide,
    (b) at least one diphenol curing agent, and
    (c) a curing catalyst selected from the group consisting of imidazoles, quaternary ammonium halides and carboxylates, quaternary phosphonium halides and carboxylates, and mixtures thereof;
    wherein a concentration of the diphenol curing agent, as an equivalent ratio r of epoxide groups to a total of phenolic groups of the diphenol curing agent, ranges from 1.2 to 2; and
    wherein the curable divinylarene dioxide resin composition, upon being cured, forms a cured epoxy resin which: (1) exhibits a heat resistance, as determined by glass transition temperature greater than a corresponding composition lacking a curing catalyst, component (c); and (2) is insoluble in an organic solvent.

2. The composition of claim 1, wherein the divinylarene dioxide is selected from the group consisting of divinylbenzene dioxide, divinylnaphthalene dioxide, divinylbiphenyl dioxide, divinyldiphenylether dioxide, and mixtures thereof.

3. The composition of claim 1, wherein the divinylarene dioxide is divinylbenzene dioxide.

4. The composition of claim 1, wherein the concentration of said divinylarene dioxide ranges from about 10 weight percent to about 90 weight percent.

5. The composition of claim 1, wherein the at least one diphenol curing agent comprises a diphenol, a bisphenol, or a difunctional phenolic oligomer.

6. The composition of claim 1, including a monophenol selected from the group consisting of phenol; o-, m-, or p-cresol; p-tert-butylphenol; m-chlorophenol; anisole; p-phenylphenol; 4-hydroxydiphenylether; 1- or 2-naphthol; and mixtures thereof.

7. The composition of claim 6, wherein the concentration of said monophenol ranges from about 0.01 weight percent to about 50 weight percent.

8. The composition of claim 1, wherein the concentration of said catalyst ranges from about 0.01 weight percent to about 20 weight percent.

9. The composition of claim 1, including a co-curing agent.

10. A thermoset cured product prepared by curing the composition of claim 1, wherein the cured product comprises a coating, an adhesive, a composite or a laminate.

11. A process for preparing a curable divinylarene dioxide resin composition comprising admixing:
(a) at least one divinylarene dioxide resin;
(b) at least one diphenol curing agent; and
(c) a curing catalyst selected from the group consisting of imidazoles, quaternary ammonium halides and carboxylates, quaternary phosphonium halides and carboxylates, and mixtures thereof;
wherein a concentration of the diphenol curing agent, as an equivalent ratio r of epoxide groups to a total of phenolic groups of the diphenol curing agent, ranges from 1.2 to 2; and
wherein the curable divinylarene dioxide resin composition, upon being cured, forms a cured epoxy resin which: (1) exhibits a heat resistance, as determined by glass transition temperature greater than a corresponding composition lacking a curing catalyst, component (c); and (2) is insoluble in an organic solvent.

12. A process for preparing a cured thermoset comprising:
(i) preparing a curable divinylarene dioxide resin composition comprising admixing:
(a) at least one divinylarene dioxide resin;
(b) at least one diphenol curing agent; and
(c) a curing catalyst selected from the group consisting of imidazoles, quaternary ammonium halides and carboxylates, quaternary phosphonium halides and carboxylates, and mixtures thereof;
wherein a concentration of the diphenol curing agent, as an equivalent ratio r of epoxide groups to a total of phenolic groups of the diphenol curing agent, ranges from 1.2 to 2 and
wherein the curable divinylarene dioxide resin composition, upon being cured, forms a cured epoxy resin which: (1) exhibits a heat resistance, as determined by glass transition temperature greater than a corresponding composition lacking a curing catalyst, component (c); and (2) is insoluble in an organic solvent; and
(ii) heating the composition of step (i) at a temperature of from about 25° C. to about 300° C.

* * * * *